(12) United States Patent
Richards, IV

(10) Patent No.: US 10,142,018 B2
(45) Date of Patent: Nov. 27, 2018

(54) VISIBLE LIGHT COMMUNICATION VIA SOLID STATE LIGHTING DEVICES

(71) Applicant: Cree, Inc., Durham, NC (US)

(72) Inventor: Charles W. Richards, IV, Cary, NC (US)

(73) Assignee: Cree, Inc., Durham, NC (US)

( * ) Notice: Subject to any disclaimer, the term of this patent is extended or adjusted under 35 U.S.C. 154(b) by 610 days.

(21) Appl. No.: 14/199,586

(22) Filed: Mar. 6, 2014

(65) Prior Publication Data

US 2014/0255038 A1 Sep. 11, 2014

Related U.S. Application Data

(60) Provisional application No. 61/773,519, filed on Mar. 6, 2013.

(51) Int. Cl.
*H04B 10/00* (2013.01)
*H04B 10/116* (2013.01)

(52) U.S. Cl.
CPC .................. *H04B 10/116* (2013.01)

(58) Field of Classification Search
CPC .................................................. H04B 10/116
USPC .................................................. 398/115–118
See application file for complete search history.

(56) References Cited

U.S. PATENT DOCUMENTS

| | | | | |
|---|---|---|---|---|
| 7,923,739 B2 * | 4/2011 | Hussell | ............... | H01L 25/0753 257/88 |
| 8,022,388 B2 * | 9/2011 | Brandes | .............. | H01L 25/0753 257/100 |
| 8,248,467 B1 * | 8/2012 | Ganick | ................ | G01C 21/206 340/13.24 |
| 8,648,546 B2 * | 2/2014 | Van De Ven | ........ | H05B 33/086 315/149 |
| 8,666,254 B2 * | 3/2014 | Chan | .................... | H04B 10/116 398/124 |

(Continued)

OTHER PUBLICATIONS

Author Unknown, "IEEE Standard for Local and metropolitan area networks—Part 15.7: Short-Range Wireless Optical Communication Using Visible Light," IEEE Standard 802.15.7, Sep. 6, 2011, the Institute of Electrical and Electronics Engineers, Inc., 309 pages.

(Continued)

*Primary Examiner* — Amritbir Sandhu
(74) *Attorney, Agent, or Firm* — Withrow & Terranova, P.L.L.C.

(57) ABSTRACT

A solid-state lighting fixture includes a first group of solid-state light elements, a second group of solid-state light elements, and a light control module. The first group of solid-state light elements is configured to emit visible light at a first wavelength. The second group of solid-state light elements is configured to emit light at a second wavelength, which is different from the first wavelength. The light control module is configured to modulate the light emitted from the first group of solid-state light elements and modulate the light emitted from the second group of solid-state light elements, respectively, such that the modulation pattern of the emitted light from each one of the first group of solid-state light elements and the second group of solid-state light elements communicates a first subset of data and a second subset of data, respectively, while being undetectable to the human eye.

35 Claims, 11 Drawing Sheets

(56) References Cited

U.S. PATENT DOCUMENTS

| | | | | |
|---|---|---|---|---|
| 8,716,952 | B2* | 5/2014 | Van de Ven | F21K 9/00 313/498 |
| 8,736,186 | B2* | 5/2014 | Chobot | H05B 33/0863 315/209 R |
| 8,847,513 | B2* | 9/2014 | Van De Ven | H05B 33/086 315/151 |
| 8,847,516 | B2* | 9/2014 | Chobot | H05B 33/0857 315/210 |
| 9,066,382 | B2* | 6/2015 | van de Ven | H05B 33/0857 |
| 9,414,454 | B2* | 8/2016 | Brandes | H05B 33/086 |
| 9,686,477 | B2* | 6/2017 | Walters | H04N 5/2354 |
| 9,756,696 | B1* | 9/2017 | Bradford | H05B 33/0866 |
| 9,826,598 | B2* | 11/2017 | Roberts | G06T 7/20 |
| 9,900,957 | B2* | 2/2018 | van de Ven | F21V 29/74 |
| 2006/0152140 | A1* | 7/2006 | Brandes | C09K 11/586 313/503 |
| 2007/0008258 | A1* | 1/2007 | Yamamoto | H04B 10/116 345/83 |
| 2008/0136661 | A1 | 6/2008 | Pederson et al. | |
| 2009/0079537 | A1* | 3/2009 | Seitz | G05B 19/406 340/5.2 |
| 2009/0160363 | A1* | 6/2009 | Negley | H05B 33/086 315/294 |
| 2009/0238238 | A1* | 9/2009 | Hollander | G01J 5/02 374/121 |
| 2010/0074622 | A1* | 3/2010 | Damink | G01V 8/20 398/78 |
| 2010/0079091 | A1* | 4/2010 | Deixler | H05B 37/0254 315/320 |
| 2010/0133554 | A1 | 6/2010 | Hussell | |
| 2010/0302799 | A1* | 12/2010 | Rosberg | G02B 6/0041 362/602 |
| 2011/0012141 | A1* | 1/2011 | Le Toquin | H01L 33/502 257/89 |
| 2011/0089863 | A1* | 4/2011 | Makino | G09F 13/04 315/294 |
| 2011/0133672 | A1* | 6/2011 | Tsang | F21S 10/02 315/294 |
| 2011/0303896 | A1 | 12/2011 | Brandes | |
| 2012/0032632 | A1* | 2/2012 | Soar | H01F 38/14 320/108 |
| 2012/0104278 | A1* | 5/2012 | Downing | G01N 21/6428 250/458.1 |
| 2012/0328299 | A1* | 12/2012 | Pickard | H04B 10/116 398/106 |
| 2013/0293114 | A1* | 11/2013 | Tipirneni | H05B 33/086 315/151 |
| 2014/0159099 | A1* | 6/2014 | Wu | H01L 33/38 257/99 |
| 2014/0270792 | A1* | 9/2014 | Zhang | H04B 10/116 398/118 |
| 2014/0334825 | A1* | 11/2014 | Pandharipande | H04L 12/6418 398/128 |
| 2015/0102733 | A1* | 4/2015 | Knapp | H04L 12/40045 315/152 |
| 2015/0104184 | A1* | 4/2015 | Jeffrey | G09C 5/00 398/130 |
| 2015/0104185 | A1* | 4/2015 | Breuer | G01C 3/08 398/131 |
| 2015/0124433 | A1* | 5/2015 | Onishi | H04B 10/116 362/84 |
| 2015/0145406 | A1* | 5/2015 | Li | F21V 3/02 313/502 |
| 2015/0188631 | A1* | 7/2015 | Harbers | H05B 33/0803 398/119 |
| 2015/0222355 | A1* | 8/2015 | Ueki | H04B 10/116 345/33 |
| 2016/0099773 | A1* | 4/2016 | Raj | H04B 10/116 398/118 |
| 2016/0191156 | A1* | 6/2016 | Chen | H04B 10/116 398/118 |

OTHER PUBLICATIONS

Kloeppel, James E., "Scientists break light modulation speed record—twice," University of Illinois News Bureau, Jun. 15, 2009, news.illinois.edu/news/09/0615speed.html, 4 pages.

* cited by examiner

VISIBLE LIGHT COMMUNICATION VIA SOLID STATE LIGHTING DEVICES

RELATED APPLICATIONS

This application claims the benefit of provisional patent application Ser. No. 61/773,519, filed Mar. 6, 2013, the disclosure of which is hereby incorporated herein by reference in its entirety.

FIELD OF THE DISCLOSURE

The present disclosure relates to solid-state lighting fixtures. Specifically, the present disclosure relates to the use of solid-state lighting fixtures to communicate data via visible light.

BACKGROUND

In recent years, a movement has gained traction to replace incandescent light bulbs with solid-state lighting devices that employ more efficient lighting technologies. One such technology that shows tremendous promise employs light emitting diodes (LEDs). Compared with incandescent bulbs, LED lighting devices are much more efficient at converting electrical energy into light and are longer lasting. As a result, lighting fixtures that employ LED technologies are expected to eventually replace incandescent bulbs in residential, commercial, and industrial applications.

In an effort to take advantage of the proliferation of solid-state lighting devices, many technologies have focused on modulating the light output of one or more solid-state lighting devices to create a network in which data is communicated via visible light. By modulating the light output of a solid-state lighting device at a high frequency relative to the visual response rate of the human eye, data can be communicated via any number of modulation schemes, while the modulation of the light output remains undetectable to the human eye. Communicating data via visible light may afford several advantages, for example, in an environment in which radio frequency (RF) signals cannot reliably propagate. Further, as many residential, commercial, and industrial applications have already converted to the use of solid-state lighting devices, the infrastructure for a visible light network may already be well established. Although many attempts to communicate data via visible light have been met with some degree of success, constraints on bandwidth and throughput have generally hampered the widespread use of such technologies.

SUMMARY

The present disclosure relates to visible light communication via solid-state lighting devices. According to one embodiment, a solid-state lighting fixture includes a first group of solid-state light elements, a second group of solid-state light elements, and a light control module. The first group of solid-state light elements is configured to emit visible light at a first wavelength. The second group of solid-state light elements is configured to emit visible light at a second wavelength, which is different from the first wavelength. The light control module is configured to modulate the light emitted from the first group of solid-state light elements and modulate the light emitted from the second group of solid-state light elements such that the modulation pattern of the emitted light from each one of the first group of solid-state light elements and the second group of solid-state light elements communicates a first subset of data and a second subset of data, respectively, while being undetectable to the human eye. Using a combination of the first wavelength and the second wavelength effectively produces wavelength diversity, which provides a more robust communication network.

According to one embodiment, the light emitted from the first group of solid-state light elements and the light emitted from the second group of solid-state light elements combine to provide light at a desired brightness, color, and/or color temperature.

According to one embodiment, a solid-state visible light communication system includes one or more solid-state lighting fixtures and a network controller. Each of the one or more solid-state lighting fixtures includes a first group of solid-state light elements and a second group of solid-state light elements. The first group of solid-state light elements is configured to emit modulated light at a first wavelength. The second group of solid-state light elements is configured to emit modulated light at a second wavelength, which is different that the first wavelength. The modulation pattern of the light emitted from the first group of solid-state light elements and the second group of solid-state light elements communicates a first subset of data and a second subset of data, respectively, while being undetectable to the human eye. The network controller receives data from an external source, and selectively forwards the received data for communication via visible light to one or more of the plurality of solid-state lighting fixtures.

According to one embodiment, the light emitted from the first group of solid-state light elements and the light emitted from the second group of solid-state light elements combine to provide light at a desired brightness, color, and/or color temperature.

According to one embodiment, a method for communicating data via the visible light provided from a solid-state lighting fixture including a first group of solid-state light elements configured to emit light at a first wavelength, and a second group of solid-state light elements configured to emit light at a second wavelength, which is different than the first wavelength, includes modulating the light emitted from the first group of solid-state light elements and the light emitted from the second group of solid-state light elements. The modulation pattern of the light emitted from the first group of solid-state light elements and the second group of solid-state light elements communicates a first subset of data and a second subset of data, respectively, while being undetectable to the human eye.

According to one embodiment, the light emitted from the first group of solid-state light elements and the light emitted from the second group of solid-state light elements combine to provide light at a desired brightness, color, and/or color temperature.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
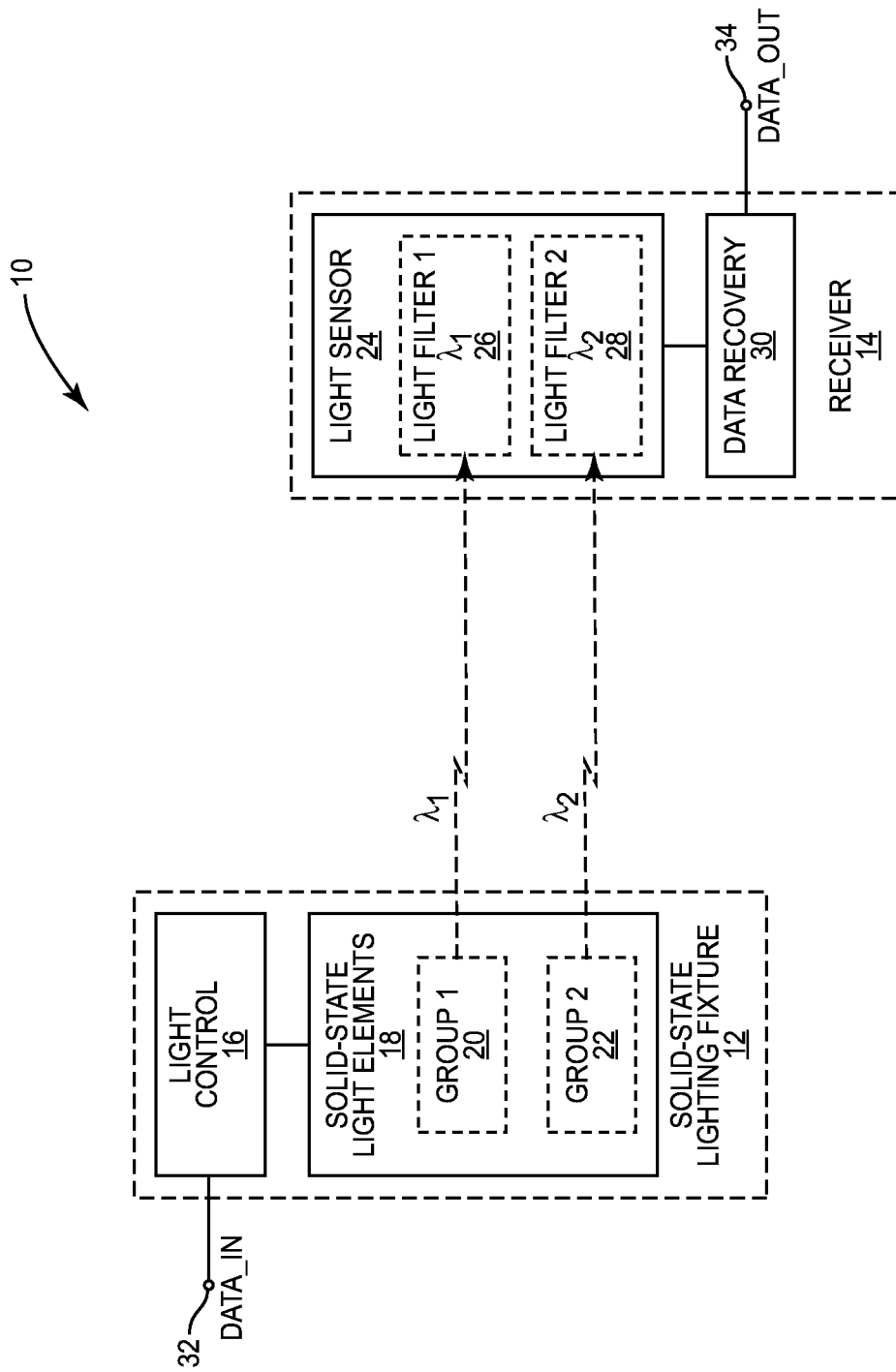
FIG. 1 is a schematic diagram showing a solid-state lighting fixture and a receiver for communicating via visible light according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Turning now to FIG. 1, a solid-state visible light communication system 10 is shown according to one embodiment of the present disclosure. The solid-state visible light communication system 10 includes at least one solid-state lighting fixture 12 and at least one receiver 14. The solid-state lighting fixture 12 includes a light control module 16 and a number of solid-state light elements 18, which are separated into a first group of solid-state light elements 20 and a second group of solid-state light elements 22. The first group of solid-state light elements 20 may emit light at a first wavelength $\lambda_1$, while the second group of solid-state light elements 22 may emit light at a second wavelength $\lambda_2$. The receiver 14 includes a light sensor 24, which in turn includes a first light filter 26 and a second light filter 28, and a data recovery module 30.

In operation, the light control module 16 of the solid-state lighting fixture 12 receives a data signal DATA_IN at a data input node 32. The light control module 16 may split the data signal DATA_IN into multiple parts; for example, the light control module 16 may split the data signal DATA_IN into a first subset of data and a second subset of data. The light control module 16 then modulates the light emitted from the first group of solid-state light elements 20 in order to convey the first subset of data via the visible light emitted from the first group of solid-state light elements 20. Further, the light control module 16 modulates the light emitted from the second group of solid-state light elements 22 in order to convey the second subset of data via the visible light emitted from the second group of solid-state light elements 22. The light control module 16 may modulate the first group of solid-state light elements 20 and the second group of solid-state light elements 22 simultaneously in order to communicate the first subset of data and the second subset of data at the same time. Accordingly, the solid-state visible light communication system 10 may effectively transfer twice as much data in the same amount of time, thereby improving the bandwidth of the solid-state visible light communication system.

The solid-state lighting fixture 12 may simultaneously produce visible light for illuminating a given area while communicating data in the solid-state visible light communication system 10. Accordingly, the light control module 16 may modulate the light emitted from the first group of solid-state light elements 20 and the light emitted from the second group of solid-state light elements 22 such that the modulation pattern is undetectable to the human eye. Specifically, the light control module 16 may modulate the light emitted from the first group of solid-state light elements 20 and the light emitted from the second group of solid-state light elements 22 above modulation frequency of >1000 Hz, such that the light output of the solid-state lighting fixture 12 is perceived as continuous by the human eye.

The wavelength of the light emitted from the first group of solid-state light elements 20 and the light emitted from the second group of solid-state light elements 22 may be selected to combine and produce light at a desired color temperature. For example, the light emitted from the first group of solid-state light elements 20 and the light emitted from the second group of solid-state light elements 22 may combine to produce "white" light with a color temperature in the range of 2500K to 5500K.

According to one embodiment, the solid-state light elements 18 may be light emitting diodes (LEDs). As will be appreciated by those of ordinary skill in the art, the wavelength of the light emitted from solid-state light elements 18 may be controlled, at least in part, by the phosphor used for the solid-state light elements 18. Accordingly, the first group of solid-state light elements 20 may have a different phosphor than the second group of solid-state light elements 22 such that the first wavelength $\lambda_1$ is different from the second wavelength $\lambda_2$. In one exemplary embodiment of the solid-state visible light communication system 10, the first group of solid-state light elements 20 are blue-shifted yellow (BSY) LEDs that emit bluish-yellow light or blue-shifted green (BSG) LEDs that emit bluish-green light, while the second group of solid-state light elements 22 are red LEDs that emit reddish light. The red and bluish-yellow or bluish-green light may mix to form "white" light at a desired color temperature.

Although only two groups of solid-state light elements 18 are shown in FIG. 1, the solid-state lighting fixture 12 may include any number of groups of solid-state light elements 18 without departing from the principles of the present disclosure. As will be appreciated by those of ordinary skill in the art, the larger the number of groups of solid-state light elements 18 in the solid-state lighting fixture, the higher the bandwidth of the solid-state visible light communication system 10. However, the number of groups of the solid-state light elements 18 in the solid-state lighting fixture 12 may be limited by the required separation between various wavelengths of light used by the different groups of solid-state light elements in order to separately receive the different subsets of data, as well as the desired color temperature of the overall light emitted from the solid-state lighting fixture 12, as discussed in further detail below.

The light control module 16 may modulate the light emitted from the first group of solid-state light elements 20 and the light emitted from the second group of solid-state light elements 22 in any number of ways in order to convey the first subset of data and the second subset of data, respectively. For example, the light control module 16 may modulate the light emitted from the first group of solid-state light elements 20 and the light emitted from the second group of solid-state light elements 22 using phase-shift keying (PSK), amplitude-shift keying (ASK), on-off keying (OOK), quadrature amplitude modulation (QAM), or spread spectrum techniques.

The receiver 14 receives the light emitted from the first group of solid-state light elements 20 and the second group of solid-state light elements 22 at the light sensor 24. The receiver 14 may utilize the first light filter 26 and the second light filter 28 to isolate the light emitted from the first group of solid-state light elements 20 and the light emitted from the second group of solid-state light elements 22, respectively. Accordingly, the receiver 14 may separately receive the first subset of data via the light received from the first group of solid-state light elements 20 and the second subset of data via the light received from the second group of solid-state light elements 22. The data recovery module 30 may reassemble the first subset of data and the second subset of data in order to reconstruct the data signal DATA_IN. The data signal DATA_IN may then be transmitted to a data output node 34 of the receiver module as a data output signal DATA_OUT.

The first light filter 26 and the second light filter 28 may be optical filters. In one embodiment, the first light filter 26 is an optical filter configured to pass signals about the first wavelength $\lambda_1$ to the light sensor 24, while attenuating signals outside of the first wavelength $\lambda_1$. Similarly, the second light filter 28 may be an optical filter configured to pass signals about the second wavelength $\lambda_2$ to the light sensor 24, while attenuating signals outside of the second wavelength $\lambda_2$. In other embodiments, the first light filter 26 and the second light filter 28 may be digital filters provided within or after the light sensor 24, the details of which will be understood by those of ordinary skill in the art. Further, the first light filter 26 and the second light filter 28 may selectively interchange, via a mechanical mechanism or otherwise, in order to isolate signals about the first wavelength $\lambda_1$ and the second wavelength $\lambda_2$. Although the light sensor 24 is shown as a single element in FIG. 1, any number of light sensors may be used in the receiver 14 without departing from the principles of the present disclosure. For example, the receiver 14 may include a separate light sensor 24 for each wavelength of light used for communication in the solid-state visible light communication system 10.

As discussed above, any number of modulation schemes may be used to modulate the light emitted from the first group of solid-state light elements 20 and the second group of solid-state light elements 22. Accordingly, the data recovery module 30 may be configured to demodulate the respective light signals received from the first group of solid-state light elements 20 and the second group of solid-state light elements 22 in order to reconstruct the data signal DATA_IN.

Figure 2:
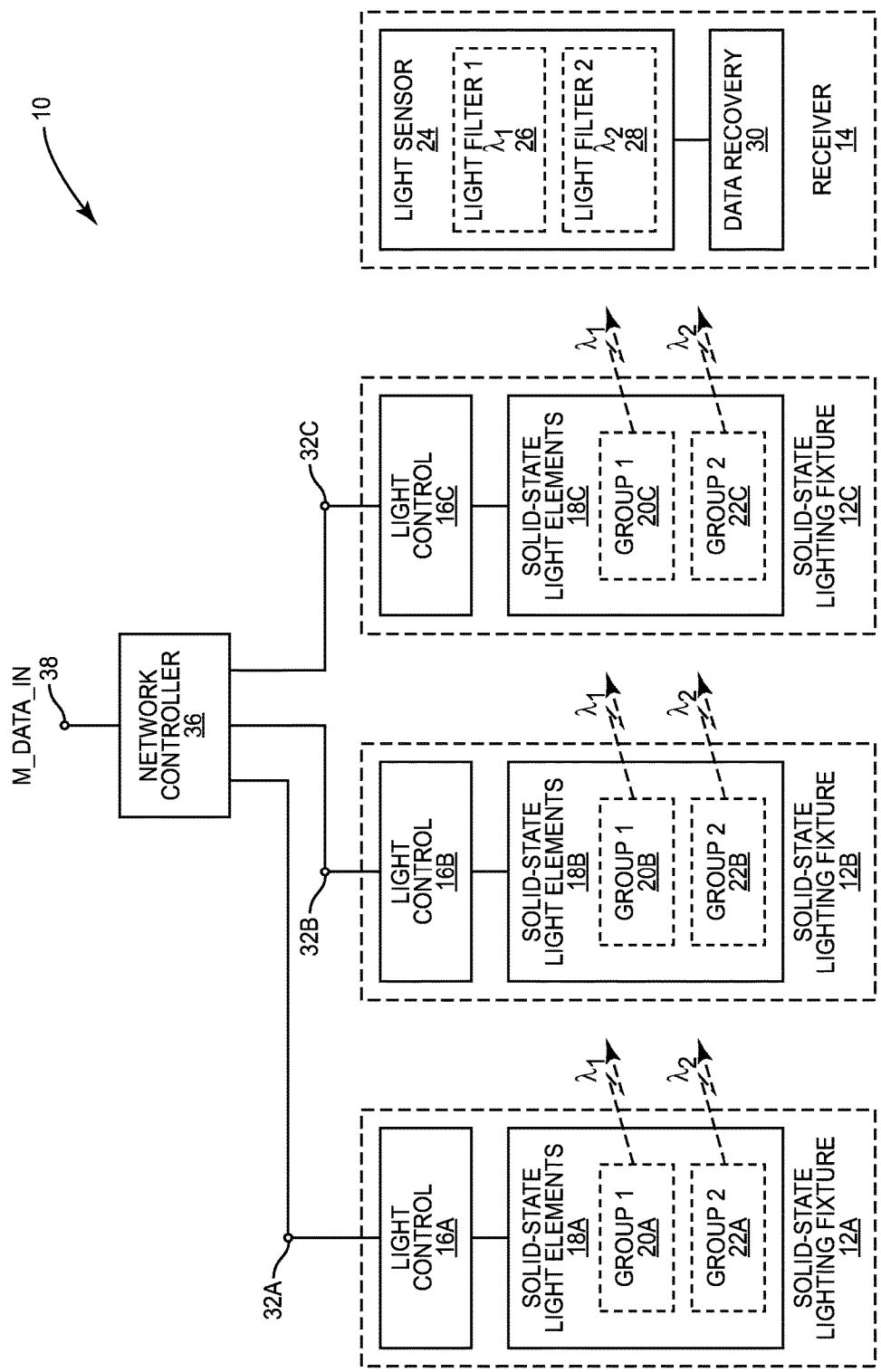
FIG. 2 is a schematic diagram showing a solid-state visible light communication system according to one embodiment of the present disclosure.

FIG. 2 shows the solid-state visible light communication system 10 according to an additional embodiment of the present disclosure. The solid-state visible light communication system 10 shown in FIG. 2 includes a number of solid-state lighting fixtures 12, each one connected via the data input node 32 to a network controller 36. The network controller 36 includes a master data input node 38, at which a master data signal M_DATA_IN is received. The master data input node 38 may receive data via a wired connection, a wireless connection, or any other suitable method. The network controller 36 may split the master data signal M_DATA_IN into a number of separate subsets of data, each of which may be sent to all or a subset of the solid-state lighting fixtures 12 in the solid-state visible light communication system 10. As discussed above, the light control module 16 of each one of the solid-state lighting fixtures 12 may then modulate the light emitted from the first group of solid-state light elements 20 and the light emitted from the second group of solid-state light elements 22 to communicate the received data.

The receiver 14 may receive data from all or a subset of the solid-state lighting fixtures 12 in the solid-state visible light communication system 10. In one exemplary embodiment, the solid-state lighting fixtures 12 are separated such that the receiver 14 is only in communication with one of the solid-state lighting fixtures 12 at a time. The network controller 36 may thus appropriately route data to each one of the solid-state lighting fixtures 12 that is pertinent to the area in which light is emitted from the respective solid-state lighting fixture 12, as discussed in further detail below. In other embodiments, the receiver 14 may simultaneously receive data from two or more of the solid-state lighting fixtures 12.

Figure 3:
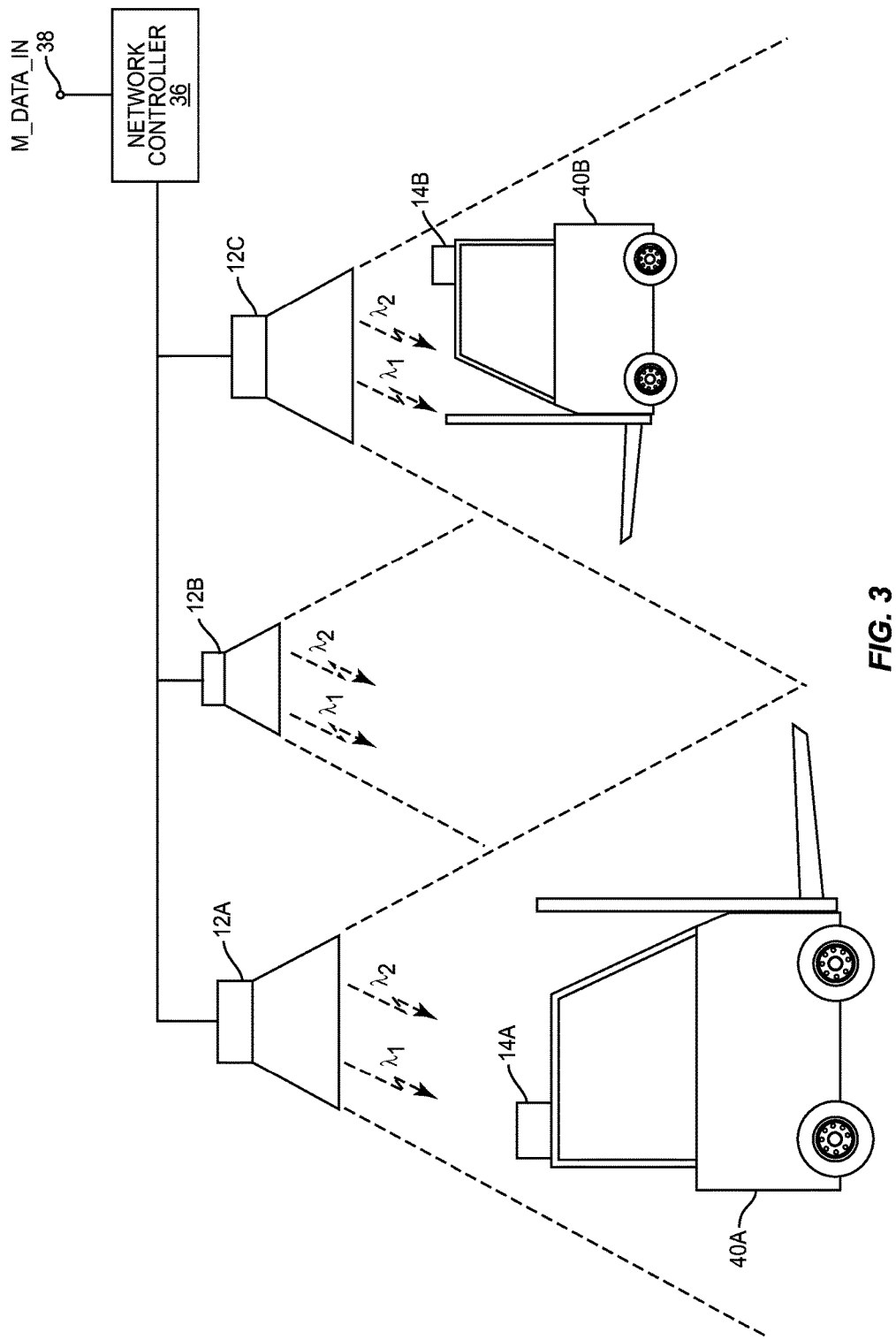
FIG. 3 depicts an exemplary application of a solid-state visible light communication system according to one embodiment of the present disclosure.

FIG. 3 shows an exemplary application of the solid-state visible light communication system 10. In the exemplary embodiment shown in FIG. 3, the solid-state visible light communication system 10 may be used in a warehouse setting including one or more forklifts 40. As will be appreciated by those of ordinary skill in the art, warehouse environments are often particularly troublesome for the reliable transmission and reception of radio frequency (RF) signals on the warehouse floor. Specifically, the size, building materials, and layout of storage and shelving material in many warehouse environments often prevent the reliable propagation of RF signals. Accordingly, the solid-state visible light communication system 10 may be provided to establish a reliable communication system within the warehouse environment.

As shown in FIG. 3, each one of the solid-state lighting fixtures 12 provides light within a given area of the warehouse floor, such that each one of the solid-state lighting fixtures 12 provides light at a desired brightness and/or color temperature. Further, each one of the solid-state lighting fixtures 12 modulates the light emitted from at least the first group of solid-state light elements 20 and the second group of solid-state light elements 22 in order to communicate data to the one or more forklifts 40 as discussed above. The network controller 36 provides data to each one of the solid-state lighting fixtures 12, and may route the data such that data pertinent to the area of the warehouse in which the solid-state lighting fixtures 12 is located is sent to that lighting fixture. For example, the network controller 36 may separate data related to the inventory directly below or near a first one of the solid-state lighting fixtures 12A from data related to the inventory directly below or near a second one of the solid-state lighting fixtures 12B, routing the data to the appropriate one of the solid-state lighting fixtures 12. As discussed above, the master data input node 38 may receive data via a wired connection, a wireless connection, or any other suitable method. In one exemplary embodiment, the master data input node receives data from a cellular radio located in a place inside or outside of the warehouse with suitable reception for reliable communication. In another exemplary embodiment, the master data input node receives data over a Smartcast network formed by one or more light fixtures manufactured by Cree of Durham, N.C.

Accordingly, the one or more forklifts 40 may receive data that is relevant to the location of the warehouse in which they are currently located, such as particular inventory nearby that needs to be moved or otherwise processed. In other embodiments, the network controller 36 may send the same data to each one of the solid-state lighting fixtures 12, such that the same data is broadcast from each one of the solid-state lighting fixtures 12 throughout the warehouse environment, or may send some data to each one of the solid-state lighting fixtures 12, while sending other data to all or a subset of the solid-state lighting fixtures 12.

Each one of the forklifts 40 includes a receiver 14, which is used to receive and decode the data communicated via the visible light emitted by the one or more solid-state lighting fixtures 12. As discussed above, each one of the receivers 14 may receive light emitted from a single solid-state lighting fixture 12 or a subset of the one or more solid-state lighting fixtures 12. Accordingly, each one of the forklifts 40 may be alerted to events relevant to a given area in which the forklift 40 is located in the warehouse environment, or may alternatively receive all relevant information communicated via the solid-state visible light communication system 10. The decoded data may be used to autonomously control the one or more forklifts 40, or may be used to alert forklift operators to assigned tasks, nearby or otherwise, in need of completion.

Although one or more forklifts 40 are used for exemplary purposes in the solid-state visible light communication system 10 shown in FIG. 3, any number of vehicles or devices may be used in conjunction with the solid-state visible light communication system 10, all of which are contemplated herein.

Figure 4B:
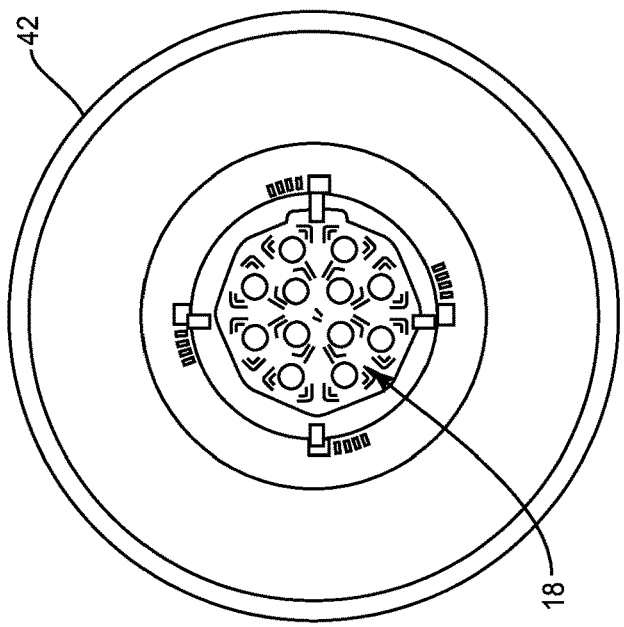
FIGS. 4A and 4B show exemplary solid-state lighting fixtures according to one embodiment of the present disclosure.
Figure 4A:
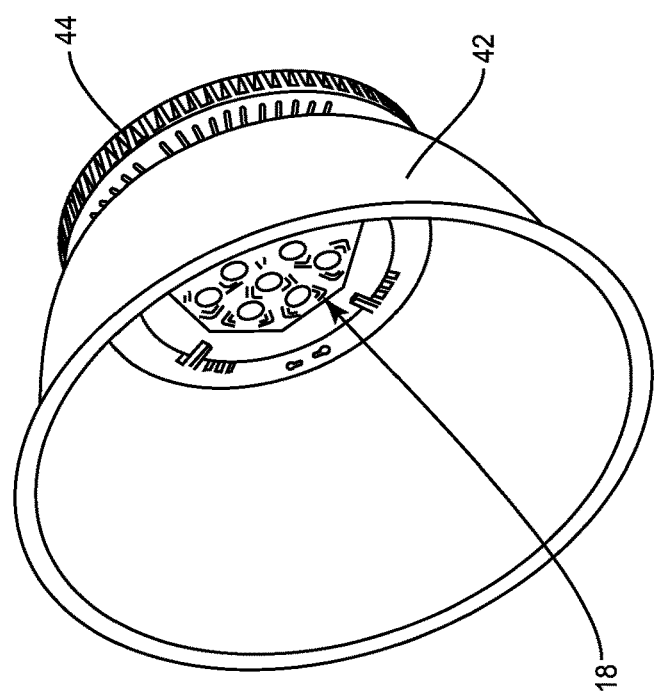

FIGS. 4A and 4B show an exemplary embodiment of the solid-state lighting fixture 12 for use in the solid-state visible light communication system 10. As shown in FIGS. 4A and 4B, the solid-state lighting fixture 12 may be a high-bay luminaire, such as a CXB series lighting fixture manufactured by Cree, Inc. of Durham, N.C., and includes the solid-state light elements 18, a housing 42, and a heatsink 44. The light control module 16 may be contained in the heatsink 44, or may be located elsewhere. The solid-state light elements 18 may be mounted such that they are in direct contact with the heatsink 44 in order to dissipate the heat provided from the solid-state light elements 18. As discussed above, the solid-state light elements 18 are divided into at least a first group of solid-state light elements 20 and a second group of solid-state light elements 22. The number and location of each one of the separate solid-state light elements 18 within each one of the first group of solid-state light elements 20 and the second group of solid-state light elements 22 may occur in a variety of configurations, all of which are contemplated herein.

Figure 5:
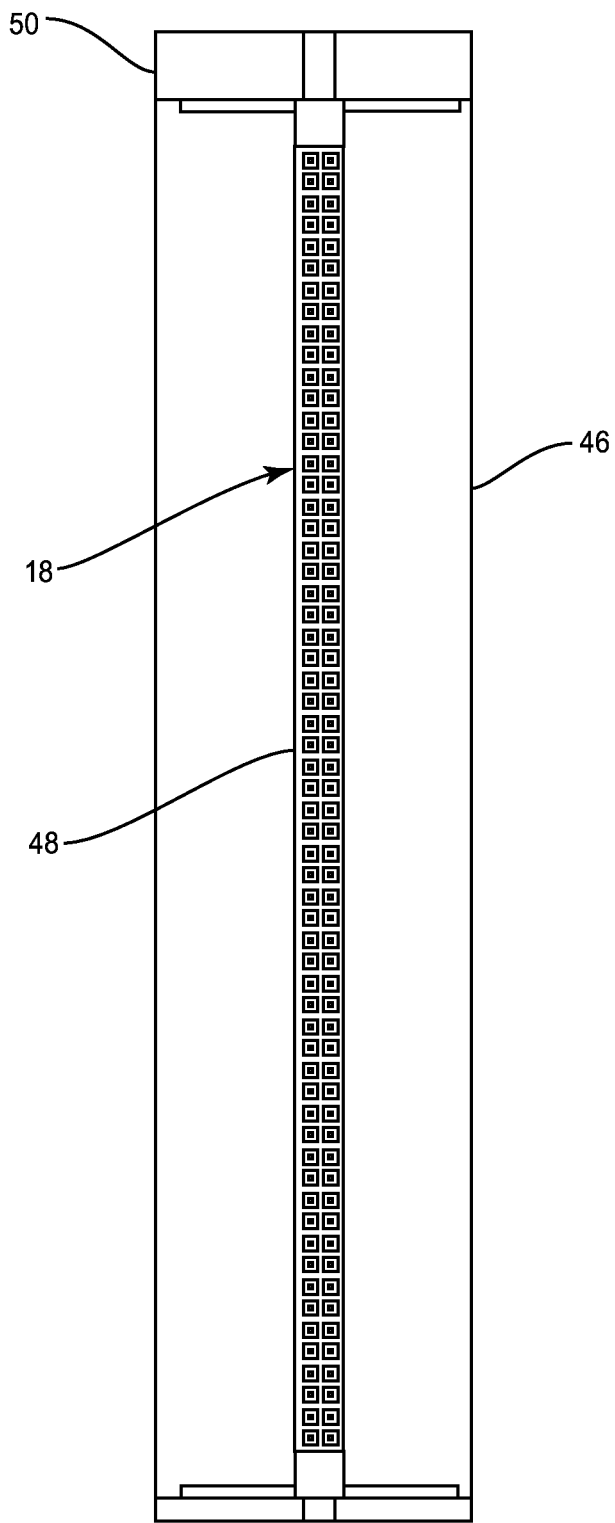
FIG. 5 shows an exemplary solid-state lighting fixture according to an additional embodiment of the present disclosure.

FIG. 5 shows an additional exemplary embodiment of the solid-state lighting fixture 12 for use in the solid-state visible light communication system 10. As shown in FIG. 5, the solid-state lighting fixture 12 may be a troffer-type luminaire, such as a CS series lighting fixture manufactured by Cree, Inc. of Durham, N.C., and includes the solid-state light elements 18, a housing 46, and a heatsink 48. Further, the solid-state lighting fixture 12 may include a control housing 50, in which the light control module 16 is provided. The solid-state light elements 18 may be mounted such that they are in direct contact with the heatsink 48 in order to dissipate the heat provided from the solid-state light elements 18. As discussed above, the solid-state light elements 18 are divided into at least a first group of solid-state light elements 20 and a second group of solid-state light elements 22. The number and location of each one of the separate solid-state light elements 18 within each one of the first group of solid-state light elements 20 and the second group of solid-state light elements 22 may occur in a variety of configurations, all of which are contemplated herein.

Figure 6:
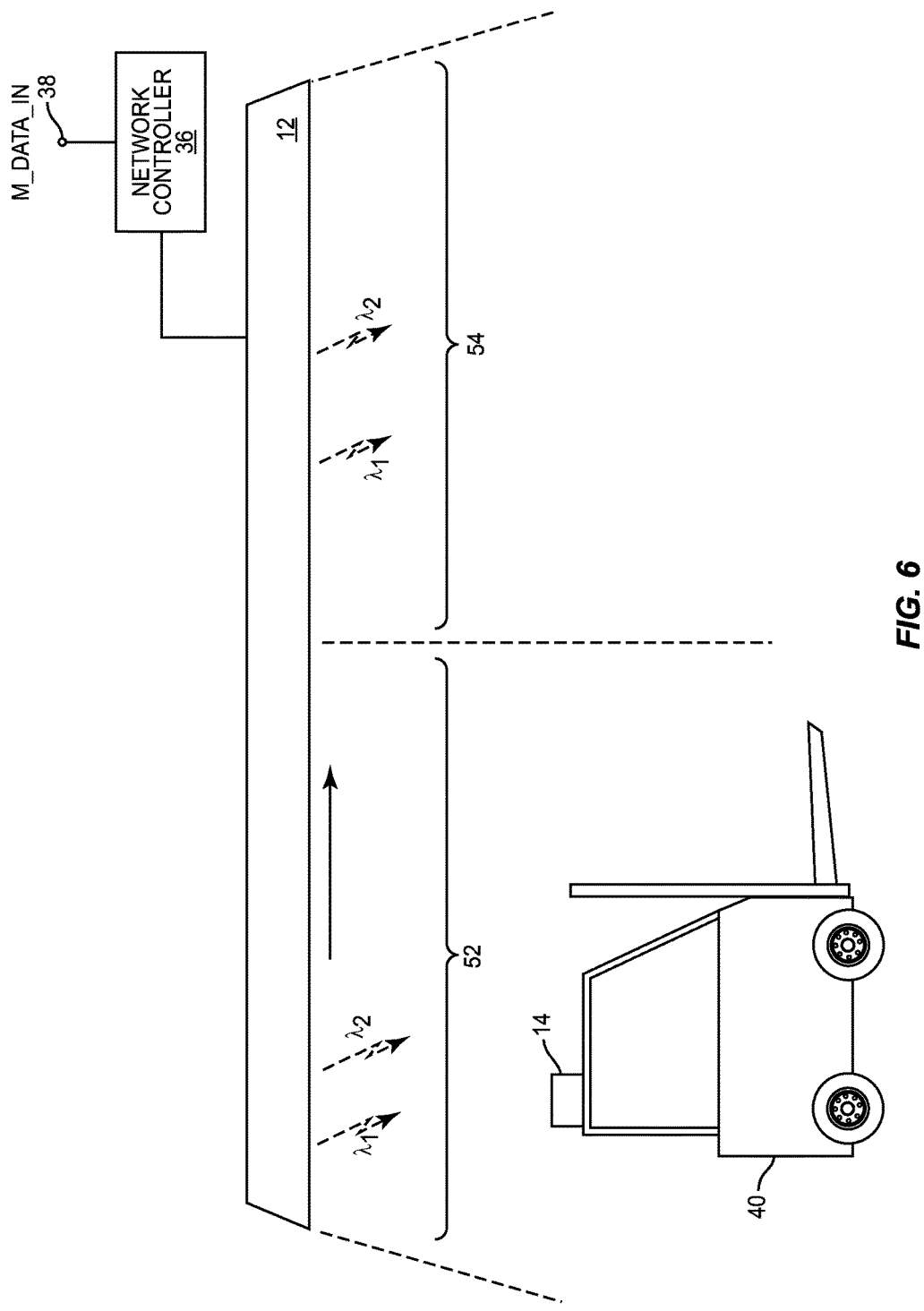
FIG. 6 depicts an exemplary application of a solid-state visible light communication system according to an additional embodiment of the present disclosure.

FIG. 6 shows an additional exemplary application of the solid-state visible light communication system 10. The exemplary embodiment shown in FIG. 6 is substantially similar to that shown in FIG. 3, but uses a troffer-type luminaire, as shown in FIG. 5, for the one or more solid-state lighting fixtures 12. Due to the size of many troffer-type luminaires, the light emitted from the solid-state lighting fixtures 12 shown in FIG. 6 may cover a large area of the warehouse floor. Accordingly, it may be difficult to communicate localized data to the one or more forklifts 40. Thus, in addition to dividing the solid-state light elements 18 of the one or more solid-state lighting fixtures 12 into a first group of solid-state light elements 20 and a second group of solid-state light elements 22, the solid-state light elements may also be divided into one or more sections, such as a first section of solid-state light elements 52 and a second section of solid-state light elements 54. Each section of the solid-state light elements 18 may be modulated by the light control module 16 independently to convey different data, such that a large area in which light is emitted from the solid-state lighting fixture 12 can be broken into several smaller areas for localized communication of data.

Although only two sections of solid-state light elements are shown in FIG. 6, any number of solid-state light sections may be used without departing from the principles of the present disclosure.

Using a troffer-type luminaire for the one or more solid-state lighting fixtures 12 may allow for additional control of the one or more forklifts 40 in the warehouse environment. In one exemplary embodiment, the light control module 16 may sequentially modulate small sections of the solid-state light elements 18, such that a modulation pattern is localized in a small area beginning at the left of the solid-state lighting fixture 12, and moves sequentially towards the right of the solid-state lighting fixture 12. Using the intensity of the modulated light received by the receiver 14 of the one or more forklifts 40 along with the modulation pattern provided in the light emitted from the one or more solid-state lighting fixtures 12 may allow the forklift 40 to follow the sequentially modulated light sections. Accordingly, the direction and speed of the one or more forklifts 40 in the warehouse environment may be controlled by the modulation pattern from the solid-state lighting fixture 12.

Figure 7:
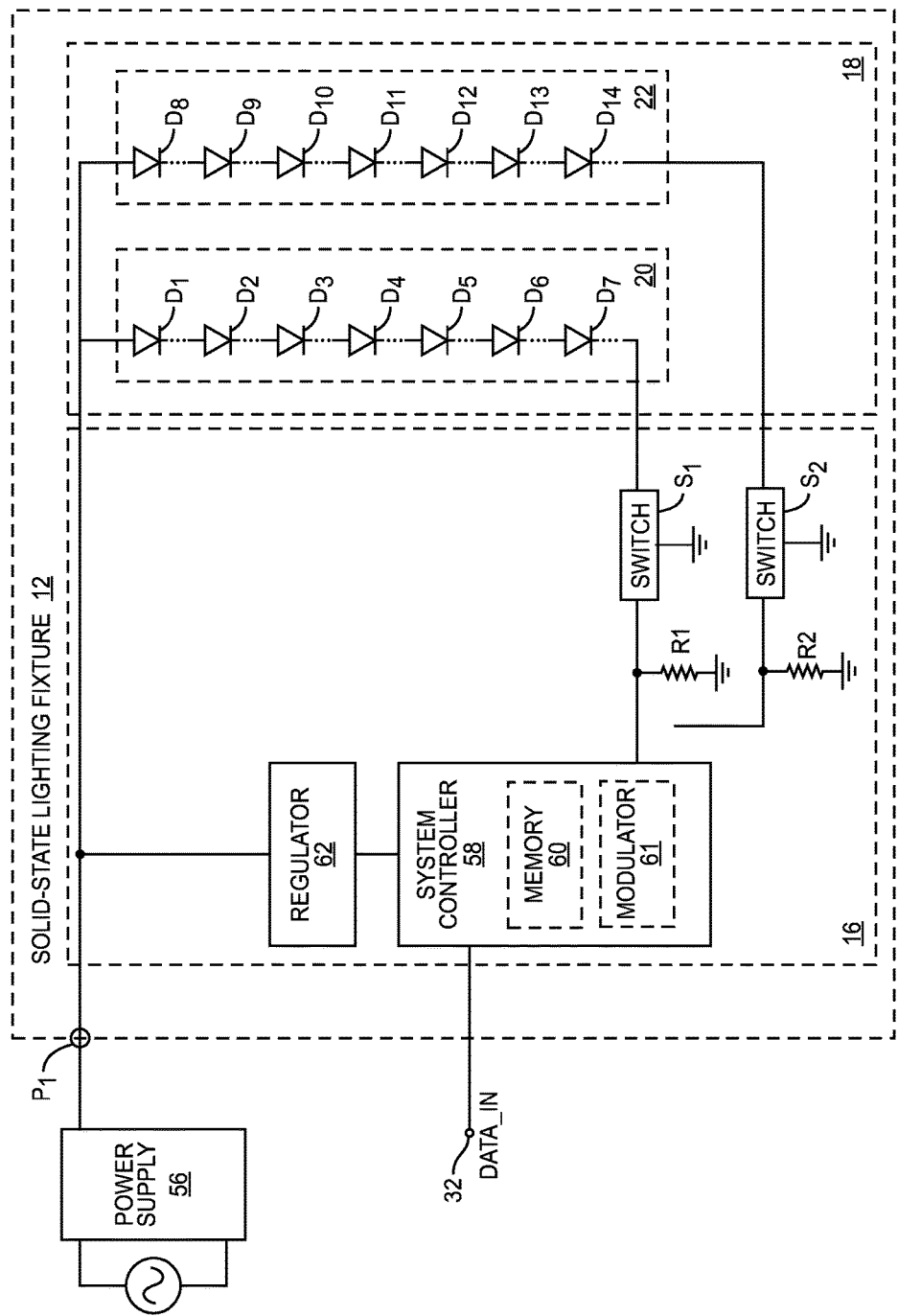
FIG. 7 shows a schematic representation of a solid-state lighting fixture according to one embodiment of the present disclosure.

FIG. 7 is a detailed schematic view of an exemplary solid-state lighting fixture 12 according to one embodiment of the present disclosure. The solid-state lighting fixture 12 includes the light control module 16 and the solid-state light elements 18, and is connected to a power supply 56. The light control module 16 includes a system controller 58, a memory 60, a modulator 61, a first switch $S_1$, a second switch $S_2$, and a regulator 62. The solid-state light elements 18 include the first group of solid-state light elements 20 and the second group of solid-state light elements 22. According to one embodiment, the power supply 56 provides a variable voltage alternating current (AC) signal, such as from a triac in a light switch (not shown) with dimming control, and provides a drive signal to port $P_1$ of the solid-state lighting fixture 12. The drive signal is provided at a level sufficient to drive the solid-state light elements 18 at an intensity level commensurate to the desired lumen output of the solid-state light elements 18 based on the level of dimming sensed from the AC signal received from the triac. As such, the drive signal may be variable and generally corresponds to the level of dimming set at the light switch.

According to one embodiment, the drive signal is a drive current provided to the solid-state light elements 18. In other embodiments, the drive signal may be a drive voltage provided across the solid-state light elements 18.

The drive signal provided by the power supply 56 may also be used to power the system controller 58. In this embodiment, the voltage provided at port $P_1$ is regulated down by the regulator 62 to a relatively fixed voltage to power the system controller 58. In operation, the drive signal provided at port $P_1$ is generally fixed at a maximum value for a maximum intensity level and at corresponding lesser values for any given level of dimming.

The solid-state light elements 18 include the first group of solid-state light elements 20, shown as a first series-connected string of LEDs $D_1$-$D_7$, and the second group of solid-state light elements 22, shown as a second series-connected string of LEDs $D_8$-$D_{14}$. The first group of solid-state light elements 20 is coupled between port $P_1$ and the first switch $S_1$, while the second group of solid-state light elements 22 is coupled between port $P_1$ and the second switch $S_2$. For current to flow through the first group of solid-state light elements 20, the system controller 58 must close the first switch $S_1$, which may be a transistor, such as a bipolar junction transistor (BJT) or field-effect transistor (FET). In one embodiment, the first switch $S_1$ is an N-channel FET where the drain is coupled to the first group of solid-state light elements 20, the source is coupled to ground, and the gate is coupled to a control output of the system controller and a pull down resistor $R_1$, which is coupled to ground. As such, the N-channel FET is normally off (or open) absent the system controller applying a positive voltage to the gate of the N-channel FET, because the resistor $R_1$ will pull the gate of the N-channel FET to ground.

To direct current through the first group of solid-state light elements 20, the system controller 58 will cause a positive voltage to be applied to the gate of the N-channel FET. When the positive voltage is applied to the gate, the N-channel FET will turn on and effectively couple the first string of series connected LEDs to ground such that current can flow through the first group of solid-state light elements 20. The flow of current from the drive signal will cause the LEDs in the first group of solid-state light elements 20 to emit light at a first wavelength with an intensity that is generally proportional to the magnitude of the drive signal. By using the modulator 61 to modulate the signal provided to the first switch $S_1$, the system controller 58 can therefore modulate the light emitted from the first group of solid-state light elements 20 in order to communicate the first subset of data, as discussed above.

The second group of solid-state light elements 22 operates in a substantially similar manner as the first group of solid-state light elements 20. In some embodiments, additional switches may be provided to individually control one or a subset of the string of series-connected LEDs in the first group of solid-state light elements 20 and the second group of solid-state light elements 22. As discussed above, the system controller 58 may use the modulator 61 to separately modulate the control signal provided to the first switch $S_1$ and the control signal provided to the second switch $S_2$ separately in order to simultaneously communicate different data via the first group of solid-state light elements 20 and the second group of solid-state light elements 22, respectively.

As discussed above, the first group of solid-state light elements 20 may be of a different type than the second group of solid-state light elements 22 in order to provide light at the first wavelength $\lambda_1$ and the second wavelength $\lambda_2$. For example, the first group of solid-state light elements may be BSY or BSG LEDs, while the second group of LEDs may be red LEDs.

Figure 8:
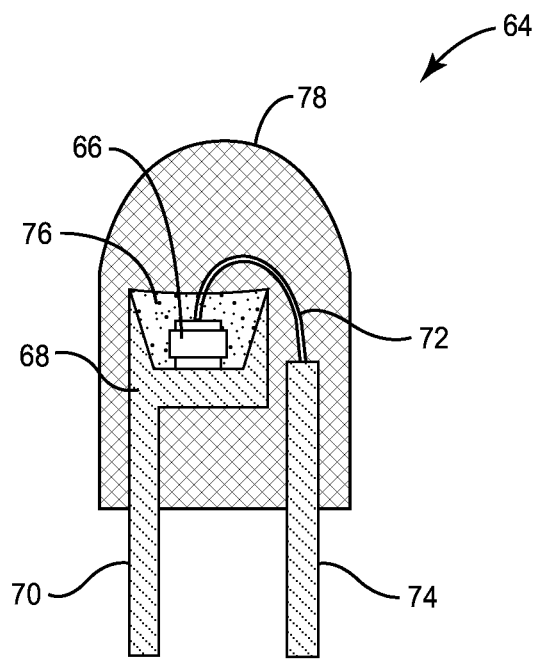
FIGS. 8 and 9 show a solid-state light element according to one embodiment of the present disclosure.

A traditional package for an LED 64, which may make up each of the solid-state light elements 18 of the solid-state lighting fixture 12 is illustrated in FIG. 8. A single LED chip 66 is mounted on a reflective cup 68 using solder or a conductive epoxy, such that ohmic contacts for the cathode (or anode) of the LED chip 66 are electrically coupled to the bottom of the reflective cup 68. The reflective cup 68 is either coupled to or integrally formed with a first lead 70 of the LED chip 66. One or more bond wires 72 connect the anode (or cathode) of the LED chip 66 to a second lead 74.

The reflective cup 68 may be filled with an encapsulant material 76 that encapsulates the LED chip 66. The encapsulant material 76 may be clear or contain a wavelength conversion material, such as a phosphor, which is described in greater detail below. The entire assembly is encapsulated in a clear protective resin 78, which may be molded in the shape of a lens to control the light emitted from the LED chip 66.

Figure 9:
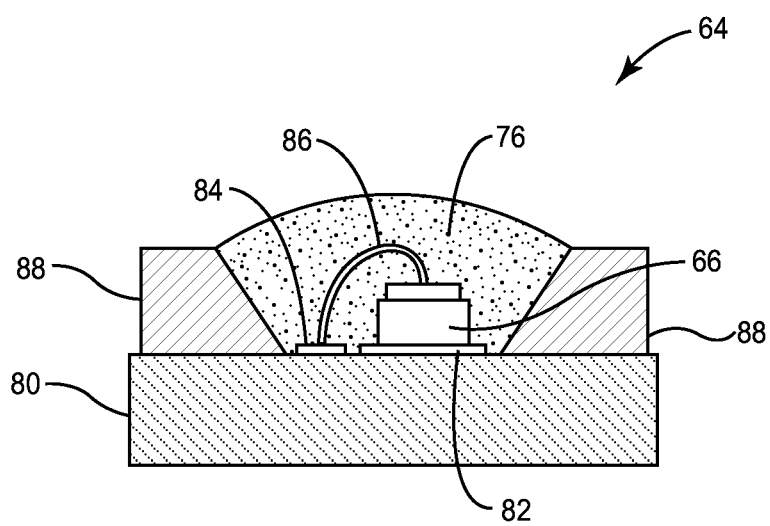

An alternative package for the LED 64 is illustrated in FIG. 9, wherein the LED chip 66 is mounted on a substrate 80. In particular, the ohmic contacts for the anode (or cathode) of the LED chip 66 are directly mounted to first contact pads 82 on the surface of the substrate 80. The ohmic contacts of the cathode (or anode) of the LED chip 66 are connected to second contact pads 84, which are also on the surface of the substrate 80 using bond wires 86. The LED chip 66 resides in a cavity of a reflector structure 88. The cavity formed by the reflector structure 88 may be filled with an encapsulant material 76 that encapsulates the LED chip 66. The encapsulant material 76 may be clear or contain a wavelength conversion material, such as a phosphor.

In either of the embodiments of FIGS. 8 and 9, if the encapsulant material 76 is clear, the light emitted by the LED chip 66 passes through the encapsulant material 76 and the protective resin 78 without any substantial shift in color. As such, the light emitted from the LED chip 66 is effectively the light emitted from the LED 64. If the encapsulant material contains a wavelength conversion material, substantially all or a portion of the light emitted by the LED chip 66 in a first wavelength range may be absorbed by the wavelength conversion material, which will responsively emit light in a second wavelength range. The concentration and type of wavelength conversion material will dictate how much of the light emitted by the LED chip 66 is absorbed by the wavelength conversion material as well as the extent of wavelength conversion. In embodiments where some of the light emitted by the LED chip 66 passes through the wavelength conversion material without being absorbed, the light passing through the wavelength conversion material will mix with the light emitted by the wavelength conversion material. Thus, when a wavelength conversion material is used, the light emitted from the LED 64 is shifted in color from the actual light emitted from the LED chip 66.

As discussed above, the solid-state light elements 18 may include a group of BSY or BSG LEDs as well as a group of red LEDs. BSY LEDs include an LED chip 66 that emits bluish light, and the wavelength conversion material is a yellow phosphor that absorbs the blue light and emits yellowish light. Even if some of the bluish light passes through the phosphor, the resultant mix of light emitted from the overall BSY LED is yellowish light. The yellowish light emitted from a BSY LED has a color point that typically falls above the Black Body Locus (BBL) on the 1931 CIE chromaticity diagram wherein the BBL corresponds to the various color temperatures of white light.

Similarly, BSG LEDs include an LED chip 66 that emits bluish light; however, the wavelength conversion material is a greenish phosphor that absorbs the blue light and emits a greenish light. Even if some of the bluish light passes through the phosphor, the resultant mix of light emitted from the overall BSG LED is greenish light. The greenish light emitted from a BSG LED typically has a color point that also falls above the BBL on the 1931 CIE chromaticity diagram wherein the BBL corresponds to various color temperatures of white light.

The red LEDs generally emit reddish light at a color point on the opposite side of the BBL (or below) as the yellowish or greenish light of the BSY or BSG LEDs. As such, the reddish light from the red LEDs mixes with the yellowish or greenish light emitted from the BSY or BSG LEDs to generate white light that has a desired color temperature and falls within a desired proximity of the BBL. Notably, the red LEDs may have LED chips 66 that natively emit reddish light wherein no wavelength conversion material is employed. Alternatively, the LED chips may be associated with a wavelength conversion material, wherein the resultant light emitted from the wavelength conversion material and any light that is emitted from the LED chip 66 without being absorbed by the wavelength conversion material mixes to form the desired reddish light.

The LED chip 66 used in the BSY or BSG LEDs may be formed from gallium nitride (GaN), indium gallium nitride (InGaN), silicon carbide (SiC), zinc selenide (ZnSe), or the like. The LED chip used in the red LEDs may be formed from an aluminum indium gallium phosphide (AlInGaP), gallium phosphide (GaP), aluminum gallium arsenide (AlGaAs), or the like. Exemplary yellow phosphors include cerium-dope yttrium aluminum garnet (YAG:Ce), yellow BOSE (Ba, O, Sr, Si, Eu) phosphors, and the like. Exemplary green phosphors include green BOSE phosphors, lutetium aluminum garnet (LuAg), cerium doped LuAg (LuAg:Ce), Maui M535 from Lightscape Materials, Inc. of 201 Washington Road, Princeton, N.J. 08540, and the like. The above LED architectures, phosphors, and material systems are merely exemplary and are not intended to provide an exhaustive listing of architectures, phosphors, and materials systems that are applicable to the concepts disclosed herein.

Figure 10:
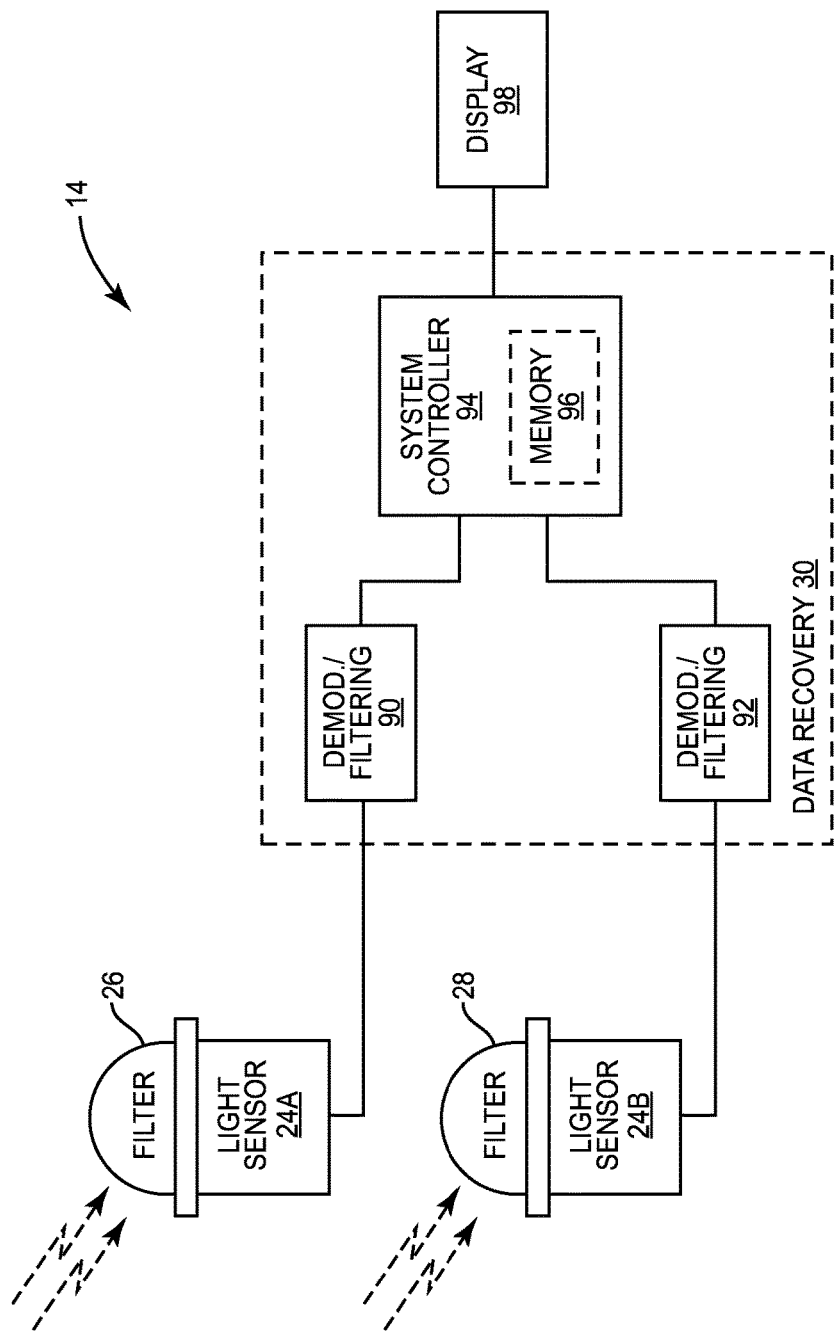
FIG. 10 shows a schematic representation of a receiver for use in a solid-state visible light communication system according to one embodiment of the present disclosure.

FIG. 10 shows a detailed schematic of the receiver 14 according to one embodiment of the present disclosure. As shown in FIG. 10, the receiver includes the light sensor 24 and the data recovery module 30. The light sensor 24 shown in FIG. 10 is broken into a first light sensor 24A, which is associated with the first light filter 26, and a second light sensor 24B, which is associated with the second light filter 28. As discussed above, the first light filter 26 may be an optical filter configured to isolate signals about the first wavelength $\lambda_1$, while attenuating signals outside of the first wavelength $\lambda_1$. Similarly, the second light filter 28 may be an optical filter configured to isolate signals about the second wavelength $\lambda_2$, while attenuating signals outside of the second wavelength $\lambda_2$.

The data recovery module 30 includes a first demodulator and filter 90, a second demodulator and filter 92, and a system controller 94, which includes a memory 96. The first demodulator and filter 90 may be configured to filter and demodulate the signal provided from the first light sensor 24A, providing a data signal representative of the first subset of data to the system controller 94. Similarly, the second demodulator and filter 92 may be configured to filter and demodulate the signal provided from the second light sensor 24B, providing a data signal representative of the second subset of data to the system controller 94. As discussed above, any number of modulation schemes may be used by the one or more solid-state lighting fixtures 12 to communicate the first subset of data and the second subset of data. The first demodulator and filter 90 and the second demodulator and filter 92 perform the corresponding demodulation process in order to recover the first subset of data and the second subset of data.

The system controller 94 receives the first subset of data and the second subset of data from the first demodulator and filter 90 and the second demodulator and filter 92, respectively. The system controller 94 then reassembles the data to recover the data signal DATA_IN sent from the one or more solid-state lighting fixtures 12. The system controller 94 may forward the data signal to an external source, such as a display 98.

Figure 11:
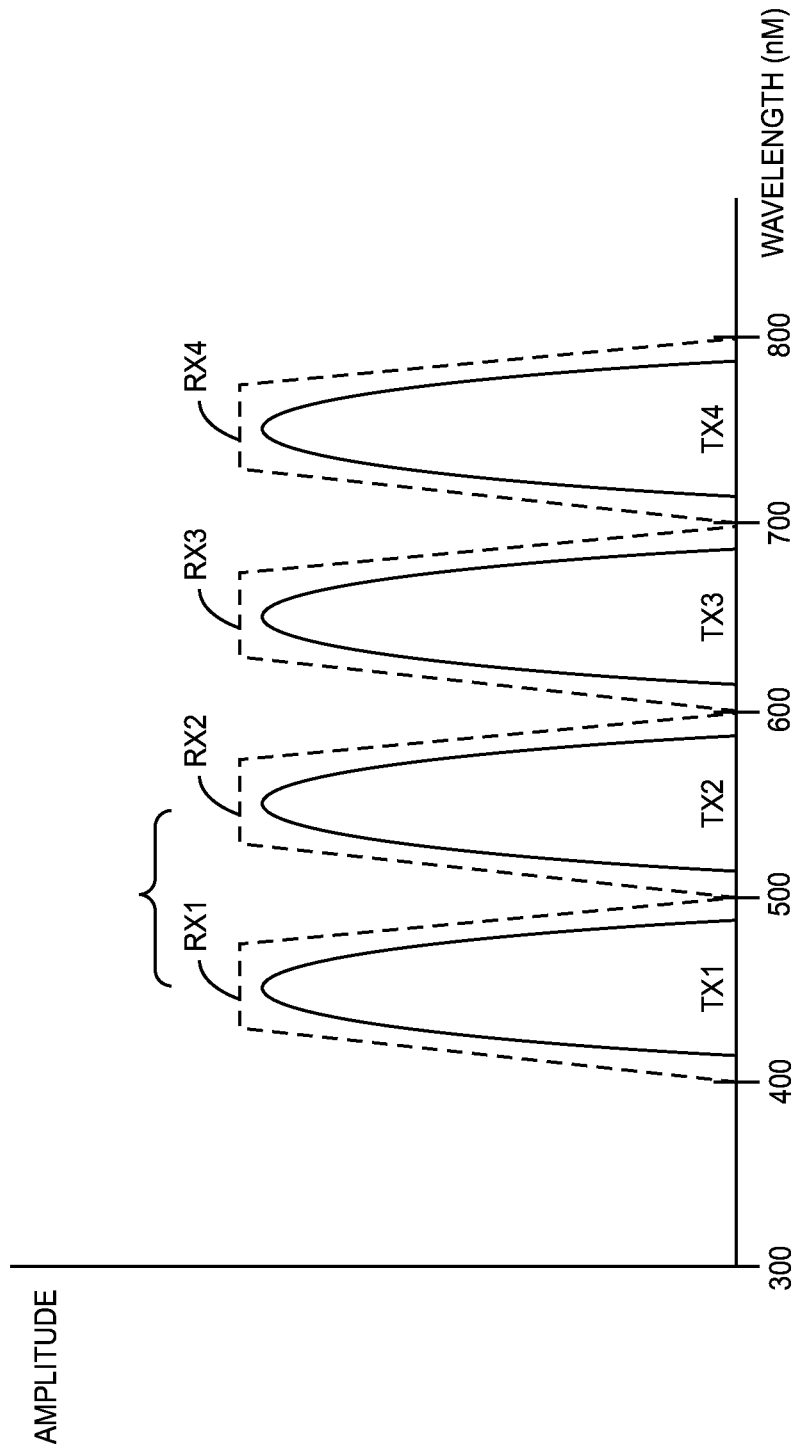
FIG. 11 is a chart showing an exemplary transmission and reception scheme for use in a solid-state visible light communication system according to one embodiment of the present disclosure.

FIG. 11 is a graph showing a transmission and reception scheme for use in the solid-state visible light communication system 10 according to one embodiment of the present disclosure. As shown in FIG. 11, data may be transmitted in the solid-state visible light communication system 10 at four different wavelengths in the range of about 400 nm to about 800 nm. For example, a first wavelength $\lambda_1$ about 450 nm may be used to transmit a first subset of data, a second wavelength $\lambda_2$ about 550 nm may be used to transmit a second subset of data, a third wavelength $\lambda_3$ about 650 nm may be used to transmit a third subset of data, and a fourth wavelength $\lambda_4$ about 750 nm may be used to transmit a third subset of data. The respective receive filter responses for each wavelength are illustrated by the dashed lines RX1-RX4. As shown in FIG. 11, each filter response is capable of isolating signals with a precision of about 100 nm. Accordingly, each different wavelength used for communication in the solid-state visible light communication system 10 should be separated by at least 100 nm to allow the receiver 14 to adequately differentiate between the separate visible light signals. The precision of each filter response RX1-RX4 shown in FIG. 11 is merely exemplary, and may be more or less precise according to various embodiments of the present disclosure.

Although FIG. 11 shows four different wavelengths used for communication in the solid-state visible light communication system 10, any number of different wavelengths may be used without departing from the principles of the present disclosure. As discussed above, the various wavelengths used to communicate data in the solid-state visible light communication system 10 combine to produce light at a desired brightness and/or color temperature. Due to this fact, the number of different wavelengths used in the system may be constrained by the range of wavelengths available for a given color temperature, as well as the separation requirements discussed above.

Figure 12:
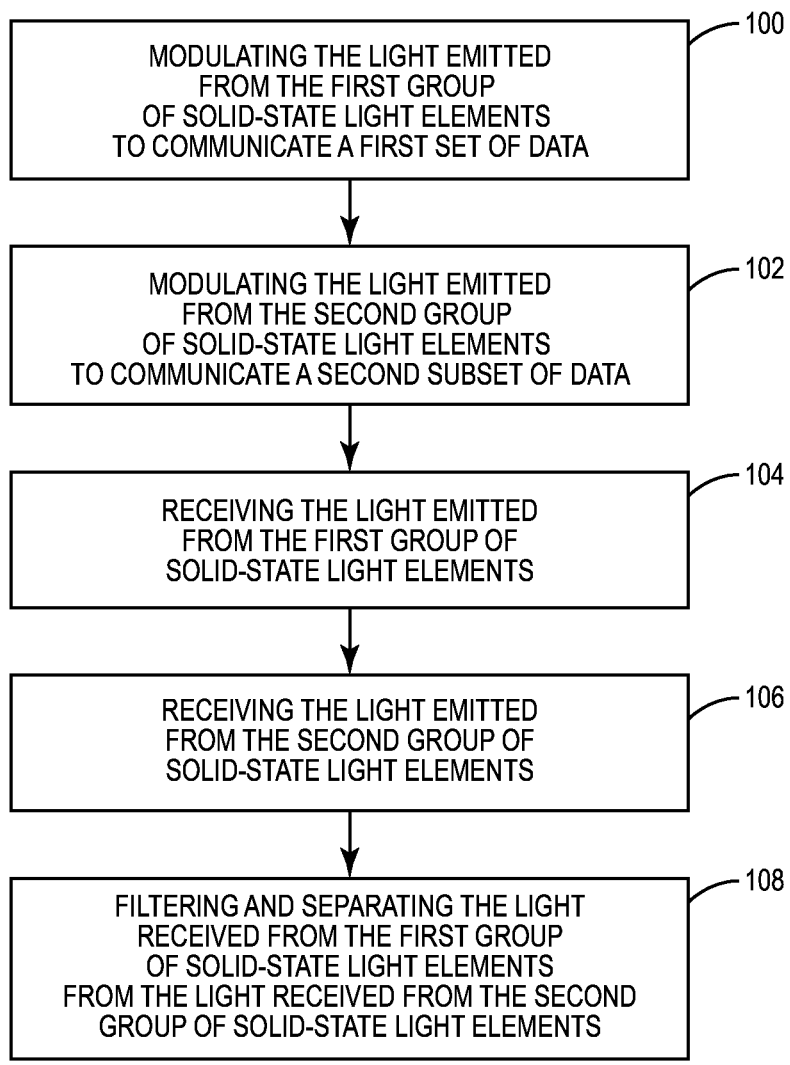
FIG. 12 is a flow chart illustrating a method for communicating via visible light with one or more solid-state lighting fixtures according to one embodiment of the present disclosure.

FIG. 12 illustrates a process for communicating data via the solid-state visible light communication system 10 according to one embodiment of the present disclosure. First, the light control module 16 of the solid-state lighting fixture 12 modulates the light emitted from the first group of solid-state light elements 20 to communicate the first subset of data (step 200). The light control module 16 further modulates the light emitted form the second group of solid-state light elements 22 to communicate the second subset of data (step 202). The receiver 14 receives the light emitted from the first group of solid-state light elements 20 (step 204) and the light emitted from the second group of solid-state light elements 22 (step 206) via the light sensor 24. The receiver 14 then filters and separates the light received from the first group of solid-state light elements 20 and the light received from the second group of solid-state light elements 22 in order to recover the first subset of data and the second subset of data (step 208).

Those skilled in the art will recognize improvements and modifications to the preferred embodiments of the present disclosure. All such improvements and modifications are considered within the scope of the concepts disclosed herein and the claims that follow.

What is claimed is:

1. A solid-state lighting fixture comprising:
   a first plurality of solid-state light elements configured to emit visible light at a first wavelength;
   a second plurality of solid-state light elements configured to emit the visible light at a second wavelength, which is different than the first wavelength; and
   a light controller modulator configured to simultaneously:
      modulate the visible light emitted from the first plurality of solid-state light elements, to emit a modulation pattern of the emitted visible light that communicates a first subset of data while being undetectable to a human eye; and
      modulate the visible light emitted from the second plurality of solid-state light elements, to emit the modulation pattern of the emitted visible light that communicates a second subset of data while being undetectable to the human eye.

2. The solid-state lighting fixture of claim 1, wherein the visible light emitted from the first plurality of solid-state light elements and the visible light emitted from the second plurality of solid-state light elements combine to provide light at a desired color.

3. The solid-state lighting fixture of claim 1, wherein the visible light emitted from the first plurality of solid-state light elements and the visible light emitted from the second plurality of solid-state light elements combine to provide light at a desired color temperature.

4. The solid-state lighting fixture of claim 3, wherein the desired color temperature is in a range of about 2500 Kelvin (K) to 5500K.

5. The solid-state lighting fixture of claim 3, wherein the desired color temperature is in a range of about 2500K to 4000K.

6. The solid-state lighting fixture of claim 1, wherein the first subset of data is different from the second subset of data.

7. The solid-state lighting fixture of claim 1, wherein the light controller modulator is further configured to:
   receive data from an external source; and
   separate the received data into the first subset of data and the second subset of data.

8. The solid-state lighting fixture of claim 1, wherein the first plurality of solid-state light elements and the second plurality of solid-state light elements are light emitting diodes (LEDs).

9. The solid-state lighting fixture of claim 8, wherein the first plurality of solid-state light elements has a different phosphor than the second plurality of solid-state light elements.

10. The solid-state lighting fixture of claim 8, wherein the first plurality of solid-state light elements includes a phosphor, and the second group of solid-state light elements does not include the phosphor.

11. A solid-state visible light communication system comprising:
- a plurality of solid-state lighting fixtures, each one of the plurality of solid-state lighting fixtures comprising a first plurality of solid-state light elements configured to emit modulated light at a first wavelength and a second plurality of solid-state light elements configured to emit the modulated light at a second wavelength simultaneously with the first plurality of solid-state light elements, wherein the second wavelength is different than the first wavelength, wherein a modulation pattern of the modulated light emitted from the first plurality of solid-state light elements and the modulated light emitted from the second plurality of solid-state light elements communicates a first subset of data and a second subset of data, respectively, while being undetectable to human eye; and
- a network controller configured to receive data from an external source, and selectively forward the received data for communication via visible light to one or more of the plurality of solid-state lighting fixtures.

12. The solid-state visible light communication system of claim 11, wherein the modulated light emitted from the first plurality of solid-state light elements and the modulated light emitted from the second plurality of solid-state light elements combine to provide light at a desired color.

13. The solid-state visible light communication system of claim 11, wherein the modulated light emitted from the first plurality of solid-state light elements and the modulated light emitted from the second plurality of solid-state light elements combine to provide light at a desired color temperature.

14. The solid-state visible light communication system of claim 13, wherein the desired color temperature is in a range of about 2500 Kelvin (K) to 5500K.

15. The solid-state visible light communication system of claim 13, wherein the desired color temperature is in a range of about 2500K to 4000K.

16. The solid-state visible light communication system of claim 11, further comprising:
- one or more receivers configured to:
  - receive the modulated light emitted from the first plurality of solid-state light elements and the second plurality of solid-state light elements of one of the plurality of solid-state lighting fixtures; and
  - filter and separate the modulated light received from the first plurality of solid-state light elements from the modulated light received from the second plurality of solid-state light elements in order to recover the first subset of data and the second subset of data, respectively.

17. The solid-state visible light communication system of claim 11, wherein the first subset of data is different from the second subset of data.

18. The solid-state visible light communication system of claim 11, wherein the modulated light emitted from each one of the plurality of solid-state lighting fixtures is provided in a radio-frequency denied environment.

19. The solid-state visible light communication system of claim 11, wherein each one of the plurality of solid-state lighting fixtures is configured to:
- receive data for communication via the visible light from the network controller; and
- separate the received data into the first subset of data and the second subset of data.

20. The solid-state visible light communication system of claim 19, further comprising:
- one or more receivers configured to:
  - receive the modulated light emitted from the first plurality of solid-state light elements of one or more of the plurality of solid-state light fixtures;
  - receive the modulated light emitted from the second plurality of solid-state light elements of one or more of the plurality of solid-state light fixtures;
  - filter and separate the modulated light received from the first plurality of solid-state light elements from the modulated light received from the second plurality of solid-state light elements in order to recover the first subset of data and the second subset of data, respectively; and
  - reassemble the first subset of data and the second subset of data.

21. The solid-state visible light communication system of claim 11, wherein the first plurality of solid-state light elements and the second plurality of solid-state light elements are light emitting diodes (LEDs).

22. The solid-state visible light communication system of claim 21, wherein the first plurality of solid-state light elements has a different phosphor than the second plurality of solid-state light elements.

23. The solid-state visible light communication system of claim 21, wherein the first plurality of solid-state light elements includes a phosphor, and the second plurality of solid-state light elements does not include the phosphor.

24. The solid-state visible light communication system of claim 11, wherein the network controller selectively forwards different data to at least two of the plurality of solid-state lighting fixtures.

25. A method for communicating data via visible light provided from a solid-state lighting fixture including a first plurality of solid-state light elements configured to emit light at a first wavelength and a second plurality of solid-state light elements configured to emit light at a second wavelength, which is different than the first wavelength, comprising simultaneously:
- modulating the light emitted from the first plurality of solid-state light elements, to emit a modulation pattern of the emitted light that communicates a first subset of data while being undetectable to a human eye; and
- modulating the light emitted from the second plurality of solid-state light elements, to emit the modulation pattern of the emitted light that communicates a second subset of data while being undetectable to the human eye.

26. The method of claim 25, wherein the light emitted from the first plurality of solid-state light elements and the light emitted from the second plurality of solid-state light elements combine to provide light at a desired color.

27. The method of claim 25, wherein the light emitted from the first plurality of solid-state light elements and the light emitted from the second plurality of solid-state light elements combine to provide light at a desired color temperature.

28. The method of claim 27, wherein the desired color temperature is in a range of about 2500 Kelvin (K) to 5500K.

29. The method of claim 27, wherein the desired color temperature is in a range of about 2500K to 4000K.

30. The method of claim 25, further comprising:
- receiving the light emitted from the first plurality of solid-state light elements;
- receiving the light emitted from the second plurality of solid-state light elements; and
- filtering and separating the light received from the first plurality of solid-state light elements from the light received from the second plurality of solid-state light elements in order to retrieve the first subset of data and the second subset of data.

31. The method of claim 25, wherein the first subset of data is different from the second subset of data.

32. The method of claim 31, further comprising:
receiving the light emitted from the first plurality of solid-state light elements;
receiving the light emitted from the second plurality of solid-state light elements;
filtering and separating the light received from the first plurality of solid-state light elements and the second plurality of solid-state light elements in order to recover the first subset of data and the second subset of data; and
reassembling the first subset of data and the second subset of data.

33. The method of claim 25, wherein the first plurality of solid-state light elements and the second plurality of solid-state light elements are light emitting diodes (LEDs).

34. The method of claim 33, wherein the first plurality of solid-state light elements has a different phosphor than the second plurality of solid-state light elements.

35. The method of claim 33, wherein the first plurality of solid-state light elements includes a phosphor, and the second plurality of solid-state light elements does not include the phosphor.

* * * * *